US012583344B1

(12) United States Patent
Perumal et al.

(10) Patent No.: US 12,583,344 B1
(45) Date of Patent: Mar. 24, 2026

(54) ELECTRIC VEHICLE DUAL USE INVERTER

(71) Applicant: GM GLOBAL TECHNOLOGY OPERATIONS LLC, Detroit, MI (US)

(72) Inventors: Varoun Perumal, Novi, MI (US); Khorshed Mohammed Alam, Canton, MI (US); Ajay Mehta, Auburn Hills, MI (US); Muhammad Ahsan Zahid, Troy, MI (US); Mazharul Chowdhury, Canton, MI (US); Minh-Khai Nguyen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 7 days.

(21) Appl. No.: 18/956,501

(22) Filed: Nov. 22, 2024

(51) Int. Cl.
| | |
|---|---|
| *B60L 53/20* | (2019.01) |
| *H02J 7/02* | (2016.01) |
| *H02P 27/05* | (2006.01) |

(52) U.S. Cl.
CPC .............. *B60L 53/20* (2019.02); *H02J 7/02* (2013.01); *H02P 27/05* (2013.01); *B60L 2210/10* (2013.01)

(58) Field of Classification Search
CPC ........ B60L 53/20; B60L 2210/10; H02J 7/02; H02P 27/05
See application file for complete search history.

(56) References Cited

U.S. PATENT DOCUMENTS

| | | | |
|---|---|---|---|
| 2021/0252990 A1* | 8/2021 | Wang ...................... | B60L 53/22 |
| 2024/0253490 A1* | 8/2024 | Berger ................ | H02M 7/5387 |
| 2024/0429831 A1* | 12/2024 | Sreedhar ................ | H02M 3/01 |

FOREIGN PATENT DOCUMENTS

| | | |
|---|---|---|
| EP | 3972119 A1 | 3/2022 |
| WO | 2024233745 A1 | 11/2024 |

* cited by examiner

*Primary Examiner* — Daniel Cavallari
*Assistant Examiner* — Duc M Pham
(74) *Attorney, Agent, or Firm* — Ingrassia Fisher & Lorenz, LLP | IF&L

(57) ABSTRACT

A battery charging system for an electric vehicle including a dual use direct current to direct current converter including a direct current to alternating current converter and a transformer for generating a rotor winding current in response to a first direct current in a propulsion mode and for generating a charging current in response to a charging mode.

20 Claims, 5 Drawing Sheets

ELECTRIC VEHICLE DUAL USE INVERTER

INTRODUCTION

The present disclosure generally relates to automotive electrical systems and electric vehicle battery propulsion systems, and more particularly relates to a method and apparatus to provide a dual use full bridge rectifier for use in excitation of a separately excited machine rotor coil in a propulsion mode and for alternating current to direct current conversion in a charging mode.

Modern electric vehicles (EVs) offer sustainable and efficient transportation. Powered by electric motors, EVs deliver instant torque, resulting in smooth and responsive acceleration. Electric motors are used in EVs to convert electrical energy from the battery into mechanical energy to turn the wheels. Typically, there are two main types of electric motors used in EVs: induction motors and permanent magnet synchronous motors (PMSMs). Induction motors are the most common type of electric motor used in EVs as they are very efficient, and they can provide a high torque output. PMSMs are often used in high-performance EVs, such as sports cars and racing cars. Modern EVs typically have two electric motors, one for each axle, but some EVs can have a single motor located under the hood or four motors, one for each wheel. Regenerative braking technology further enhances efficiency by capturing kinetic energy during deceleration and converting it into electricity. As battery technology advances, EVs are becoming increasingly practical for everyday use, with longer ranges, faster charging times, and lower maintenance costs. The expanding charging infrastructure provides convenience and peace of mind, making EV ownership more accessible than ever before. It is desirable to continue to improve the EV efficiency and convenience. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are vehicle propulsion methods and systems and related electrical systems for charging electric vehicle (EV) batteries, methods for making and methods for operating such systems, and motor vehicles and other equipment such as aircraft, trucks, buses, forklifts, construction vehicles and other electric vehicles equipped with auxiliary power outlets. By way of example, and not limitation, there are presented various embodiments of systems for providing a direct current to direct current converter for providing an isolated charging current during a charging mode and a rotor winding excitation current to a separately excited motor during a propulsion mode.

In accordance with an aspect of the present disclosure, an electric vehicle propulsion system including a battery to provide a direct current propulsion current and wherein the battery is charged in response to a charging direct current, an electric motor having a first stator winding and a first rotor winding, an input for receiving a first alternating current from an external power source and for coupling the first alternating current to the first stator winding, an inverter for converting the first alternating current received from the first stator winding during a charging mode to a second direct current in response to an inverter control signal and for generating an alternating stator drive current in response to the direct current propulsion current and for coupling the alternating stator drive current to the first stator winding during a propulsion mode, a direct current to direct current converter for converting the second direct current to the charging direct current in the charging mode, wherein the direct current to direct current converter includes a first direct current to alternating current converter for converting the second direct current to a first intermediate alternating current, a transformer for generating a second intermediate alternating current in response to the first intermediate alternating current, and an alternating current to direct current converter for converting the second intermediate alternating current to the direct current charging current, wherein, during the propulsion mode, the direct current to direct current converter is further operative to receive the direct current propulsion current from the battery, to decouple the alternating current to direct current converter from the transformer, to couple the first rotor winding to the transformer, to generate a third intermediate alternating current using first direct current to alternating current converter, to generating an alternating rotor drive current using the transformer in response to the third intermediate alternating current, and to couple the alternating rotor drive current to the first rotor winding, and a controller for controlling the inverter and the direct current to direct current converter such that a rotational force is generated in the electric motor in response to a first magnetic field generated in response to the alternating stator drive current in the first stator winding and the alternating rotor drive current in the first rotor winding.

In accordance with another aspect of the present disclosure, wherein the first alternating current is received from an external battery charger via the input.

In accordance with another aspect of the present disclosure, wherein the alternating rotor drive current is converted to a rotor drive direct current by a rotor current transformer and a rotor rectifier and wherein the first rotor winding is excited by the rotor drive direct current.

In accordance with another aspect of the present disclosure, wherein the alternating rotor drive current is coupled to the first rotor winding via a brush and slip ring.

In accordance with another aspect of the present disclosure, wherein the direct current to direct current converter and the inverter are controlled in response to a plurality of control signals generated by a motor controller.

In accordance with another aspect of the present disclosure, wherein the first alternating current is a three phase alternating current and wherein each phase of the three phase alternating current is coupled to the inverter via a separate stator winding.

In accordance with another aspect of the present disclosure, wherein the electric motor is a separately excited motor.

In accordance with another aspect of the present disclosure, wherein a torque is generated in response to the rotational force and wherein the torque is used drive an electric vehicle drive train to propel an electric vehicle.

In accordance with another aspect of the present disclosure, wherein the direct current to alternating current converter is an H bridge inverter.

In accordance with another aspect of the present disclosure, a method of controlling a direct current to direct current converter in an electric vehicle propulsion system including converting, by a direct current to alternating current converter, a first direct current to a first alternating current and for coupling the first alternating current to a transformer, generating, by the transformer, a second alternating current in response to the first alternating current and for coupling the second alternating current to a switch, converting, by an alternating current to direct current converter, the second alternating current, received from the switch, to a charging direct current, and for coupling the charging direct current to a battery, generating, by a rotor winding, a magnetic field within an electric motor in response to the second alternating current received from the switch, such that a rotational force is generated within the electric motor, and coupling, by the switch, the second alternating current to the alternating current to direct current converter and for isolating the transformer from the rotor winding in response to the electric vehicle propulsion system being in a charging mode, and coupling, by the switch, the second alternating current to the rotor winding and isolating the transformer from the alternating current to direct current converter in response to the electric vehicle propulsion system being in a propulsion mode.

In accordance with another aspect of the present disclosure, wherein the direct current to alternating current converter is controlled by an inverter controller in response to the electric vehicle propulsion system being in the propulsion mode and a charge controller in response to the electric vehicle propulsion system being in the charging mode.

In accordance with another aspect of the present disclosure, wherein the direct current to alternating current converter is an H bridge inverter.

In accordance with another aspect of the present disclosure, wherein the electric motor is a separately excited motor having an unequal number of turns in the rotor winding and a stator winding.

In accordance with another aspect of the present disclosure, further including a second direct current to alternating current converter and a second transformer for converting the first direct current to a second alternating rotor current coupled to a second rotor winding.

In accordance with another aspect of the present disclosure, wherein the first alternating current is a first switched direct current generated by an H bridge portion of the direct current to alternating current converter and wherein the first switched direct current is coupled to a brush slip ring commutator for excitation of the rotor winding.

In accordance with another aspect of the present disclosure, wherein the first direct current is received from at least one of a vehicle battery during the propulsion mode and in response to a rectification of an external alternating current in the charging mode.

In accordance with another aspect of the present disclosure, wherein the rotational force is used to drive an electric vehicle drive train to propel an electric vehicle.

In accordance with another aspect of the present disclosure, wherein the direct current to direct current converter includes an H bridge inverter and wherein the first alternating current is a alternating square wave current and wherein the alternating square wave current is coupled to a brush slip ring commutator for excitation of the rotor winding.

In accordance with another aspect of the present disclosure, a direct current to direct current converter for use in an electric vehicle propulsion system including a direct current to alternating current converter for receiving a first direct current, for converting the first direct current to a first alternating current and for coupling the first alternating current to a transformer, the transformer for receiving the first alternating current, for generating a second alternating current in response to the first alternating current and for coupling the second alternating current to a switch, an alternating current to direct current converter for receiving the second alternating current from the switch, converting the second alternating current to a charging direct current, and for coupling the charging direct current to a battery, a rotor winding for receiving the second alternating current, and for generating a magnetic field within an electric motor in response to the second alternating current such that a rotational force is generated within the electric motor, and the switch for coupling the second alternating current to the alternating current to direct current converter and for isolating the transformer from the rotor winding in response to the electric vehicle propulsion system being in a charging mode and for coupling the second alternating current to the rotor winding and isolating the transformer from the alternating current to direct current converter in response to the electric vehicle propulsion system being in a propulsion mode.

In accordance with another aspect of the present disclosure, wherein the first direct current is received from the battery in response to the electric vehicle propulsion system being in the propulsion mode, and is generated by a propulsion inverter in response to a charging alternating current coupled through a stator winding from an external source.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
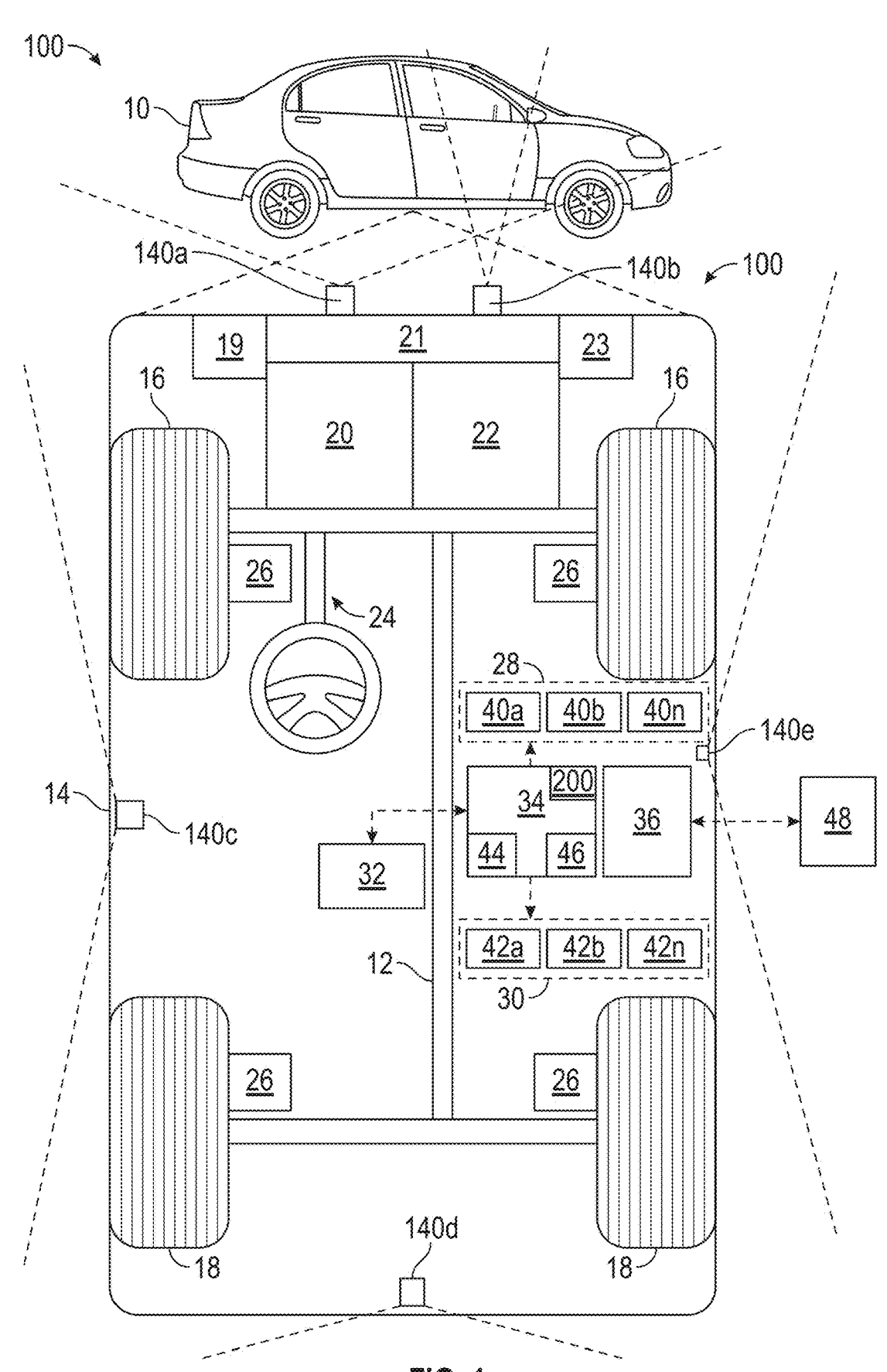
FIG. 1 shows a control system associated with a vehicle in accordance with various embodiments.

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Electric vehicle on-board battery charging equipment (OBC) is a component of the electric vehicle charging process which converts alternating current (AC) power from the grid into direct current (DC) power that can be directly absorbed by the vehicle's battery. The OBC regulates the charging rate, ensuring optimal battery health and longevity. OBCs are designed to be highly efficient, minimizing energy loss during the charging process.

While EV motors are typically driven by three phase alternating current (AC) currents converted from the direct current (DC) voltage supplied by the vehicle battery, a separately excited motor (SEM) is a type of electric motor where the stator winding and armature winding are powered by separate voltage sources. The field and armature currents in an SEM can be adjusted separately, enabling precise control of the motor's performance. By varying the field current, the motor's speed can be adjusted over a wide range. The motor can produce high torque at low speeds, making it suitable for applications requiring high starting torque or frequent speed changes. It is desirable to use SEM technology for use in EVs as SEM technology allows for independent control of the field current and armature current, providing greater flexibility in adjusting the motor's speed and torque.

With reference to FIG. 1, a control system 100 is associated with a vehicle 10 (also referred to herein as a "host vehicle") in accordance with various embodiments. In general, the control system (or simply "system") 100 provides for control of various actions of the vehicle 10 (e.g., torque control) established by Reinforcement Learning (RL) which is or can be stored in a DNN type model that controls operation in response to data from vehicle inputs, for example, as described in greater detail further below in connection with FIGS. 2-4.

In various exemplary embodiments, system 100 provides a process using an algorithm that controls torque and speed in a host vehicle's 10 embedded controller software of the system 100 allowing DNNs to be used for an ACC behavior prediction model. The system 100 enables learning of driver's preference for following distance for different vehicles such a target vehicle and to classify driver's preference based on driving scenarios; e.g., traffic signs, stop and go traffic, city driving, and the like. The system 100 uses a Q-matrix to build a knowledge base for target vehicles following a performance preference by utilizing online and historical driver and environmental information.

As depicted in FIG. 1, vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, vehicle 10 is autonomous or semi-autonomous, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally includes a propulsion system 20, a transmission system 22, a steering system 24, a brake system 26, a canister purge system 31, one or more user input devices 27, a sensor system 28, an actuator system 30, at least one data storage device 32, at least one controller 34, and a communication system 36. The propulsion system 20 may, in various embodiments, an electric machine such as a traction motor, a battery 21, an inverter 19 for converting DC current from the battery to AC current to be supplied to the electric machine, and an on board charger (OBC) 23 for converting AC current from an external power source to a DC current to be used to charge the battery 21. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmissions.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences the position of the vehicle wheels 16 and/or 18. While depicted as including a steering wheel for illustrative purposes, in some embodiments contemplated within the scope of the present disclosure, the steering system 24 may not include a steering wheel.

The controller 34 includes at least one processor 44 (and neural network 33) and a computer-readable storage device or media 46. As noted above, in various embodiments, the controller 34 (e.g., the processor 44 thereof) provides data pertaining to a projected future path of the vehicle 10, including projected future steering instructions, to the steering control system 84 in advance, for use in controlling steering for a limited period of time in the event that communications with the steering control system 84 become unavailable. Also, in various embodiments, the controller 34 provides communications to the steering control system 84 via the communication system 36 described further below, for example, via a communication bus and/or transmitter (not depicted in FIG. 1).

In various embodiments, controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store multiple neural networks, along with various operating variables, while the processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As depicted in FIG. 1, the vehicle 10 generally includes, in addition to the above-referenced steering system 24 and controller 34, a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, the vehicle 10 is an autonomous vehicle, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

The controller 34 includes a vehicle controller that operates based on the neural networks 33 model's output. In an exemplary embodiment, a feed-forward operation can be applied for an adjustment factor that is the continuous output of the neural network 33 models to generate a control action for the desired torque or other like action (in case of a continuous neural network 33 models, for example, the continuous prediction values are outputs).

In various embodiments, one or more user input devices 27 receive inputs from one or more passengers (and driver 11) of the vehicle 10. In various embodiments, the inputs include a desired destination of travel for the vehicle 10. In certain embodiments, one or more input devices 27 include an interactive touch-screen in the vehicle 10. In certain embodiments, one or more input devices 27 include a speaker for receiving audio information from the passengers. In certain other embodiments, one or more input devices 27 may include one or more other types of devices and/or maybe coupled to a user device (e.g., smartphone and/or other electronic devices) of the passengers.

The sensor system 28 includes one or more sensors 40a-40n that sense observable conditions of the exterior environment and/or the interior environment of the vehicle 10. The sensors 40a-40n include but are not limited to, radars, lidars, global positioning systems, optical cameras, thermal cameras, ultrasonic sensors, inertial measurement units, and/or other sensors.

The actuator system 30 includes one or more actuators 42a-42n that control one or more vehicle features such as, but not limited to, canister purge system 31, the intake system 38, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

Figure 2:
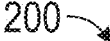
FIG. 2 shows an exemplary EV propulsion system employing a dual use DC/DC converter in accordance with various embodiments.

The data storage device 32 stores data for use in automatically controlling the vehicle 10, including the storing of data of a DNN that is established by the RL, used to predict a driver behavior for the vehicle control. In various embodiments, the data storage device 32 stores a machine learning model of a DNN and other data models established by the RL. The model established by the RL can take place for a DNN behavior prediction model or RL established model (See. FIG. 2, DNN prediction model or RL prediction model). In an exemplary embodiment, no separate training is required for the DNN rather, the DNN behavior prediction model (i.e., DNN prediction model) is implemented with a set of learned functions. In various embodiments, the neural network (i.e., DNN behavior prediction model) may be established by RL or trained by a supervised learning methodology by a remote system and communicated or provisioned in vehicle 10 (wirelessly and/or in a wired manner) and stored in the data storage device 32. The DNN behavior prediction model can also be trained via supervised or unsupervised learning based on input vehicle data of a host vehicle operations and/or sensed data about a host vehicles operating environment.

The data storage device 32 is not limited to control data, as other data may also be stored in the data storage device 32. For example, route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of controller 34, separate from controller 34, or part of controller 34 and part of a separate system.

Controller 34 implements the logic model established by RL or for the DNN based on the DNN behavior model that has been trained with a set of values, includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In various embodiments, the communication system 36 is used for communications between the controller 34, including data pertaining to a projected future path of the vehicle 10, including projected future steering instructions. Also, in various embodiments, the communication system 36 may facilitate communications between the steering control system 84 and/or more other systems and/or devices.

In certain embodiments, the communication system 36 is further configured for communication between the sensor system 28, the input device 27, the actuator system 30, one or more controllers (e.g., the controller 34), and/or more other systems and/or devices. For example, the communication system 36 may include any combination of a controller area network (CAN) bus and/or direct wiring between the sensor system 28, the actuator system 30, one or more controllers 34, and/or one or more other systems and/or devices. In various embodiments, the communication system 36 may include one or more transceivers for communicating with one or more devices and/or systems of the vehicle 10, devices of the passengers (e.g., the user device 54 of FIG. 2), and/or one or more sources of remote information (e.g., GPS data, traffic information, weather information, and so on).

Turning now to FIG. 2, an exemplary EV propulsion system 200 employing a dual use DC/DC converter 235 is shown in accordance with various embodiments. The exemplary EV propulsion system 200 can include an input 205 for receiving an AC current from an external source, such as a power grid, an onboard charger 235, a separately excited electric motor 230, an inverter 220, a motor controller 215, and a battery 225.

In some exemplary embodiments, the EV propulsion system 200 is configured to convert an AC current 212 received from an external source at the AC source input 205 to a DC current using the inverter 220 when the vehicle is in a charging mode. For example, The AC current 212, such as a three phase current, can be coupled to the stator windings 250 of the electric motor 230. In some exemplary embodiments, the external source can provide a three phase AC supply, although the currently described system can be utilized with a single phase AC supply. A sensor can be used to detect the current, voltage and phase of each of the supplied AC currents. This sensor data can then be coupled to the motor controller 215 for controlling the inverter 220 for converting the AC current 212 to a DC voltage to be used for charging the battery 225.

In some exemplary embodiments, the motor controller 215 is then configured to control the switching of the inverter 220 such that a first DC current 232 is generated and coupled to the DC/DC converter 235. In the charging mode, the DC/DC converter is configured to convert the first DC current 232 to a second DC current 234 suitable for charging the battery 225. In some exemplary embodiments, the DC/DC converter 235 can convert the first DC current 232 to a first AC current using an inverter circuit or the like, couple the first AC current to an isolation transformer within the DC/DC converter 235, resulting in a second AC current. This second AC current can then be transformed into the second DC current 235 of the appropriate amplitude using a second inverter circuit within the DC/DC converter 235. While the exemplary embodiment is described in terms of a second level inverter and/or second level on board charger module topologies, this described concepts can be equally employed with multilevel, such as three level, inverter and/or multilevel on board charger module topologies. In addition, the electric motor topology is not limited to three phase motors, but can include multi-phase motors, such as five phase motors, split-phase motors, etc.

In a propulsion mode, the AC source input 205 is disconnected from the external AC current source. A first drive DC current from the battery 225 is coupled to the inverter 220 for conversion to an AC drive current to be coupled to the stator windings 250 of the electric motor. When the electric motor 230 is a separately excited motor, a second drive DC current is coupled from the battery 225 to the DC/DC converter 235 for use in the rotor windings 255 of the electric motor 230. The motor controller 215 is configured to control the switching of the inverter 220 and the DC/DC converter 235 in order to control the speed and torque of the rotation of the electric motor 230. In some exemplary embodiments, the battery 225 can be decoupled from the isolation transformer within the DC/DC converter 235 and the second DC drive current can be applied to the rotor winding side circuitry. The rotor winding side circuitry can include an inverter which can be used to switch the DC current from the isolation transformer as required in response to control signals generated by the motor controller 215. In some exemplary embodiments, the current applied to the rotor windings can be a switched DC current, a pulse width modulated current, or an alternating current.

Figure 3:
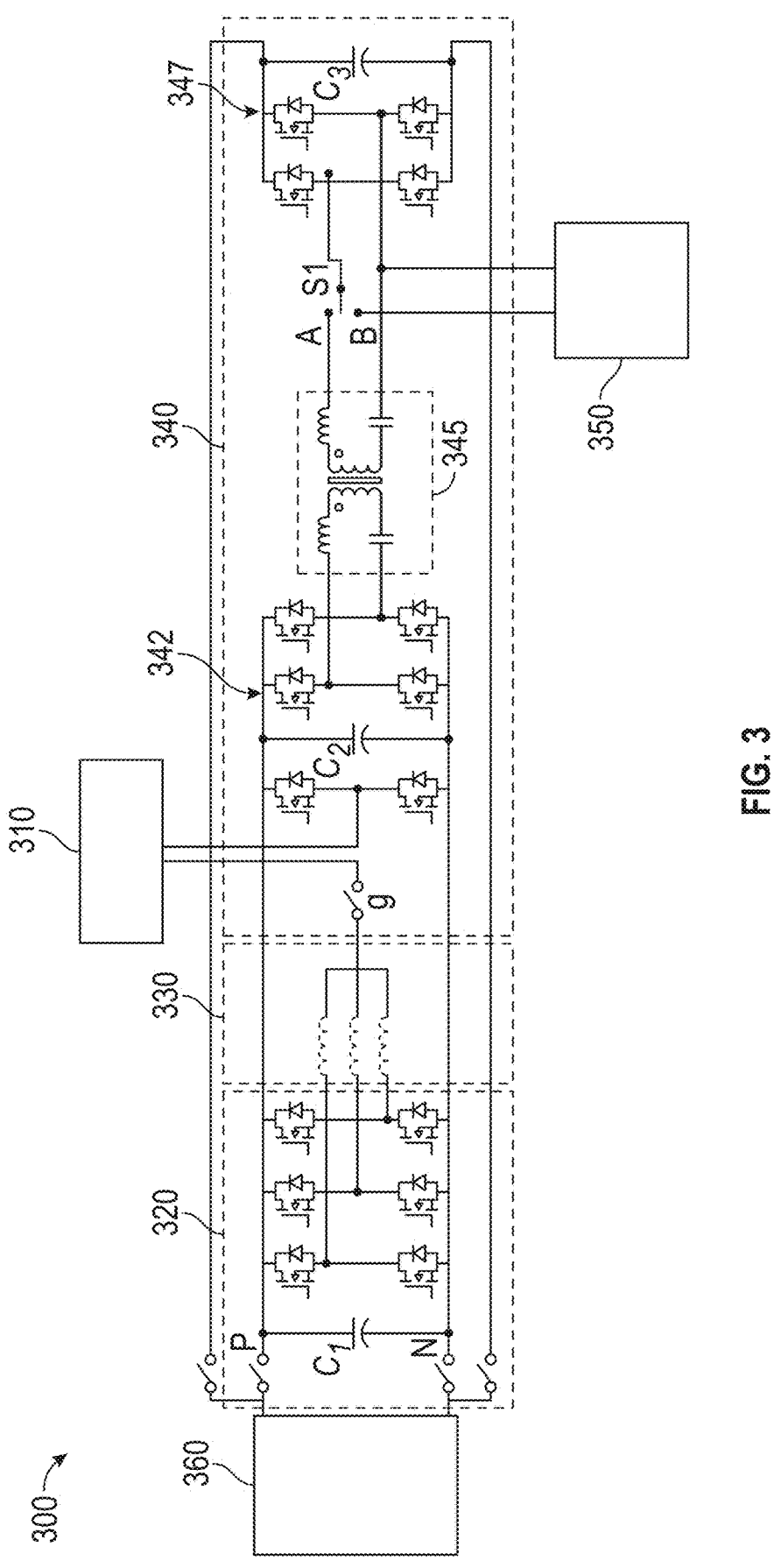
FIG. 3 shows a circuit representation for an exemplary EV propulsion system employing a dual use DC/DC converter in accordance with various embodiments.

Turning now to FIG. 3, a circuit representation for an exemplary EV propulsion system 300 employing a dual use resonant tank with transformer 340 in accordance with various embodiments is shown. With the EV in a propulsion mode and with the AC input 310 disconnected from any external AC current source, the exemplary propulsion system 300 includes a battery for suppling a DC current to the traction inverter 320. The DC current is further coupled to the resonant tank with transformer 340. The traction inverter 320 is configured to convert the DC current to an AC current using a plurality of transistors, which are switched on and off in succession, in order to generate the AC current. In some exemplary embodiments, three AC currents having different phases can be generated, and each of the three AC currents are applied to a stator winding on the traction motor stator windings 330. In some exemplary embodiments, a second switch S2 can be employed to disconnect the AC input 310 from the traction motor stator windings 330 when the EV is in a propulsion mode.

Likewise, the DC current is converted by a first portion 342 of the resonant tank with transformer 340 to an AC current. In some exemplary embodiments, the first portion 342 of the resonant tank with transformer 340 can be an H bridge rectifier and the AC current can be an alternating square wave current. The AC current can then be applied to a transformer 345. The transformer 345 is configured to convert the AC current to a rotor AC current. The second portion 347 of the resonant tank with transformer 340 is used during charging mode and is disconnected from the rotor 350 by one or more switches S1. In some exemplary embodiments, the rotor 350 can include circuitry to implement an inductive based rotor excitation in response to the rotor AC current. Alternatively, the rotor circuitry can include a brush and slip ring configuration for rotor excitation.

In some exemplary embodiments, the second portion 347 of the resonant tank with transformer 340 can be decoupled from the transformer 345 by the switch S1 during a propulsion mode, and the second portion can be used to generate a rotor winding AC current or rotor winding alternating square wave signal, to be allied to a brush and slip ring configuration for rotor excitation. The switch S1 can be a mechanical relay or an electrical switch.

Figure 4A:
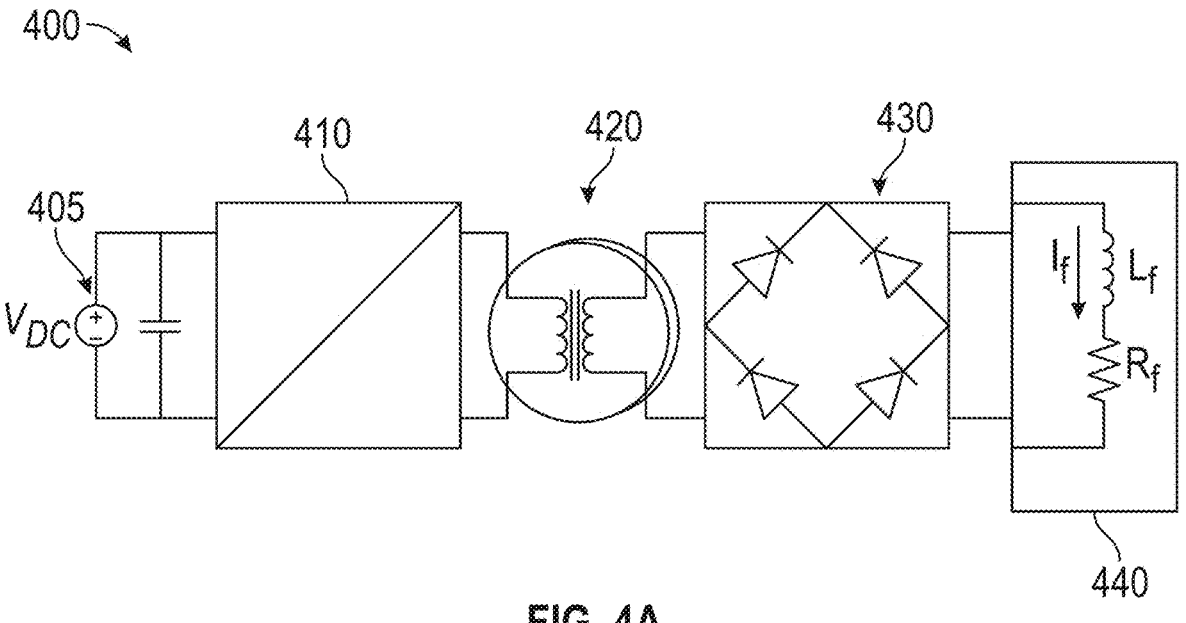
FIG. 4a shows a circuit representation of an exemplary system for an inductive based rotor excitation in accordance with various embodiments.

Turning now to FIG. 4*a*, a circuit representation of an exemplary system 400 for an inductive based rotor excitation in accordance with various embodiments is shown. The exemplary system 400 includes a battery 405 for supplying a first DC current. The first DC current is coupled to a DC/AC converter 410 to generate an AC current. The AC current is coupled to an inductive coupler 420. The resulting AC current from the inductive coupler 420 is applied to a rectifier 430, such as a bridge rectifier. The rectifier 430 converts the AC current to a DC current. For example, a bridge rectifier consists of four diodes arranged in a bridge configuration. During the positive half-cycle of the AC input, two diodes conduct, allowing current to flow through the load in one direction. During the negative half-cycle, the other two diodes conduct, maintaining the same direction of current flow through the load. This process results in a pulsating DC output voltage. To smooth out the pulsations and produce a more stable DC voltage, a filter capacitor can be connected in parallel with the load. The resulting DC voltage from the rectifier 430 is applied to the rotor windings 440. For example, in a synchronous motor, the rotor windings 440 create a magnetic field in response to the DC current that aligns with the rotating magnetic field produced by the stator windings, allowing the rotor to rotate at the same speed as the stator field.

Figure 4B:
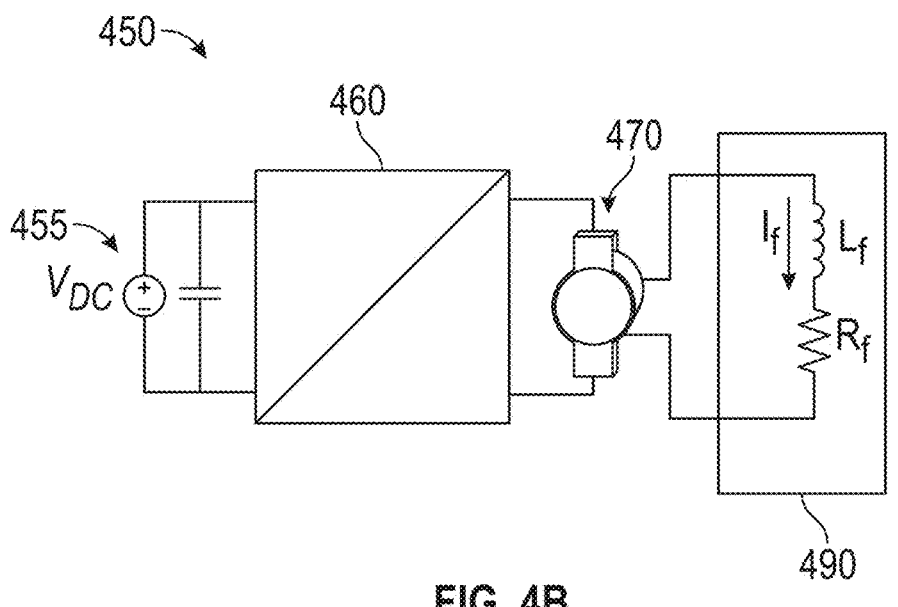
FIG. 4b shows a circuit representation of an exemplary system for brush and slip ring based rotor excitation in accordance with various embodiments.

Turning now to FIG. 4*b*, a circuit representation of an exemplary system 450 for a brush and slip ring based rotor excitation in accordance with various embodiments is shown. The exemplary system 450 includes a battery 455 for supplying a first DC current. The first DC current is coupled to a DC/DC converter 460 to generate a DC current. In a wound-rotor induction motor, the rotor windings can be connected through slip rings and brushes. The rotor windings can be configured to control the motor's starting torque and speed. The first DC current from a battery 455 is applied to a primary side of the DC-DC stage 460, such as a simple H-Bridge, or the like, to excite the rotor coil via brush-slip ring 470. The DC current waveform from a brush-slip ring 470 on the rotor is typically a pulsating DC waveform due to the nature of the mechanical commutation process. As the rotor spins, the brush and slip rings maintain contact, and the DC/DC converter 460 provides PWM voltage pulses across the SEM rotor windings 490. Due to the resistive and inductive elements of the rotor windings, a DC current is induced in the rotor winding. The shape of these pulses can vary depending on factors like the rotor speed, the number of slip rings, and the load on the motor. This DC current is applied to the rotor windings 490 to generate a magnetic field which interacts with the stator winding magnetic field to rotate the rotor.

Figure 5:
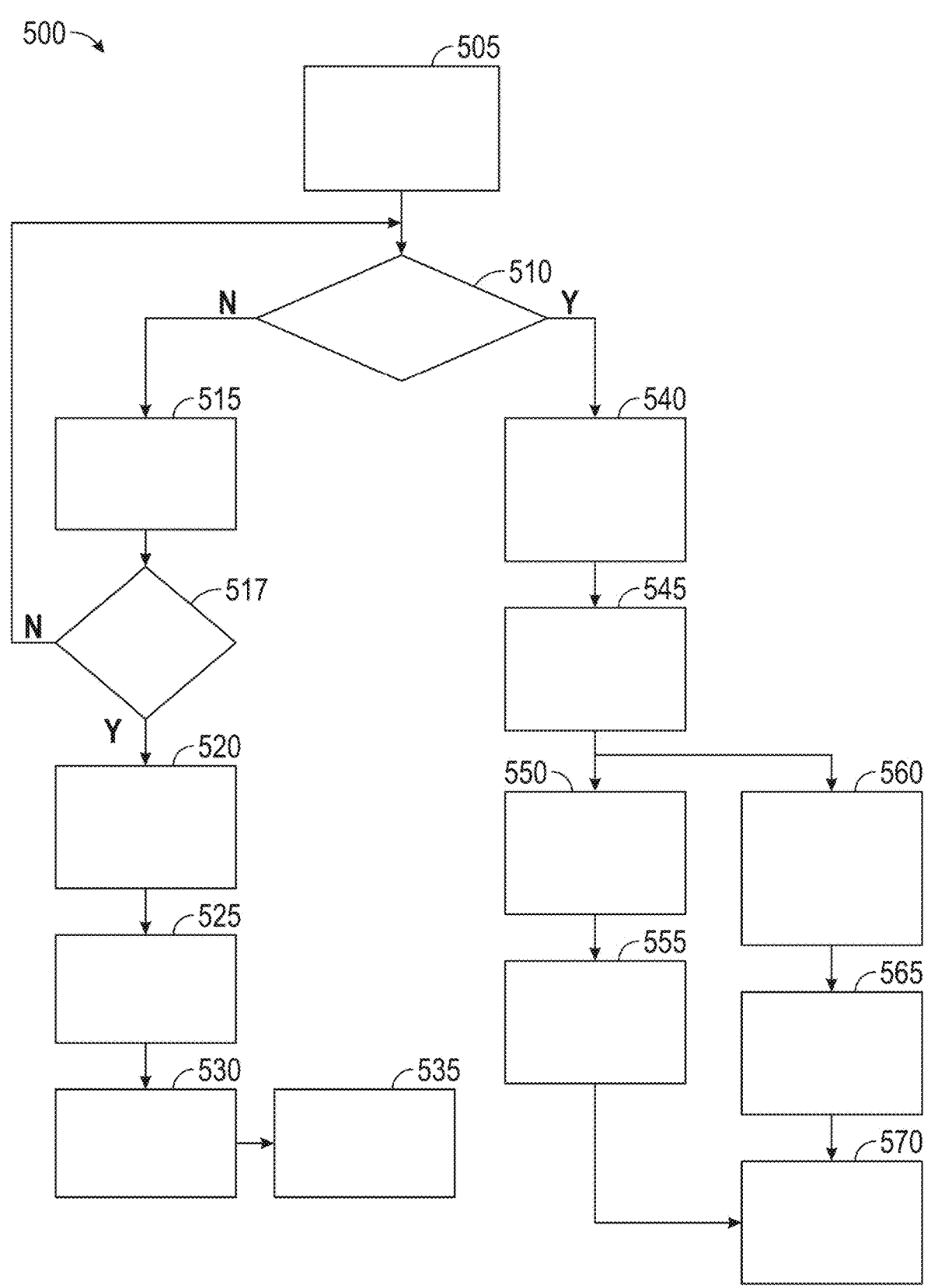
FIG. 5 shows a flowchart representative of a method controlling is illustrative of an exemplary EV propulsion and charging system employing a dual use DC/DC converter in accordance with various embodiments.

Turning now to FIG. 5, a method 500 of controlling an exemplary EV propulsion system employing a dual use DC/DC converter is shown in accordance with various embodiments. The method 500 is first initiated 505. The method 500 can be initiated in response to a vehicle mode, a vehicle entering one of a charging or a propulsion mode or the like. The method 500 next determines if 510 the vehicle is in a propulsion mode. If the vehicle is not in a propulsion mode, the method 500 can first decouple 515 the rotor winding from the DC/DC conversion circuit. This will prevent current from being applied to the rotor windings and prevents the generation of torque in the electric motor and/or back electromotive force from being generated in the rotor windings. The rotor windings can be decoupled from the DC/DC conversion circuit using a plurality of switches, such as mechanical switches or transistors.

After the rotor windings are disconnected, the method 500 determines if 517 the vehicle is in a charging mode. If the vehicle is not in a charging mode, the method 500 can return to determining if the vehicle is in a propulsion mode. Alternatively, the method 500 can be stopped. If 517 the vehicle is determined to be in a charging mode, the method next applies an AC current 520 received from an external source, such as an external battery charger, to the stator windings. The method 500 next converts these AC stator winding currents to a DC current using the inverter. Switching of the inverter can be controlled by an inverter controller in response to a parameter, such as a phase, of the AC current received from the external source. The method 500, next isolates the DC voltage, using a transformer or the like, to generate an isolated DC voltage 530. The DC voltage can be isolated by converting the DC voltage to an AC current, applying the AC current to a transformer to generate a second AC current, and then rectifying the second AC current to generate an isolated DC voltage. The isolated DC voltage is then used to charge the vehicle battery 535.

If 510, the vehicle is determined to be in a propulsion mode, the method 500 can next operative to decouple the battery from the DC/DC transformer circuit. In some exemplary embodiments, the battery can remain coupled to the DC/DC transformer circuit. In some exemplary embodiments, the battery can be decoupled from a battery side of a transformer within the DC/DC transformer circuit using one or more switches, such as high voltage transistors or the like. Once the battery is decoupled from the DC/DC transformer circuit, the method 500 next couples the rotor winding to the DC/DC transformer circuit. The rotor winding can be coupled to the DC/DC transformer circuit at an output of the transformer within the DC/DC transformer circuit.

In response to the rotor winding being coupled to the DC/DC transformer circuit, the method 500 is next operative to couple 550 a DC current from the battery to an inverter for conversion to a first AC current. This first AC current is then coupled to a stator winding in an electric motor. In addition, the method 500 is next operative to couple 560 the DC current to a DC/DC converter. A DC to AC converter and a transformer within the DC/DC converter is then used to convert the DC current to a second AC current. This second AC current is applied 565 to a rotor winding in the electric motor. The first AC current in the stator winding and the second AC current in the rotor winding generate opposing magnetic fields, thereby generating 570 a rotational force, or torque in the electric motor to propel the electric vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An electric vehicle propulsion system comprising:
    a battery to provide a direct current propulsion current and wherein the battery is charged in response to a charging direct current;
    an electric motor having a first stator winding and a first rotor winding;
    an input for receiving a first alternating current from an external power source and for coupling the first alternating current to the first stator winding;
    an inverter for converting the first alternating current received from the first stator winding during a charging mode to a second direct current in response to an inverter control signal and for generating an alternating stator drive current in response to the direct current propulsion current and for coupling the alternating stator drive current to the first stator winding during a propulsion mode;
    a direct current to direct current converter for converting the second direct current to the charging direct current in the charging mode, wherein the direct current to direct current converter includes a first direct current to alternating current converter for converting the second direct current to a first intermediate alternating current, a transformer for generating a second intermediate alternating current in response to the first intermediate alternating current, and an alternating current to direct current converter for converting the second intermediate alternating current to the direct current charging current, wherein, during the propulsion mode, the direct current to direct current converter is further operative to receive the direct current propulsion current from the battery, to decouple the alternating current to direct current converter from the transformer, to couple the first rotor winding to the transformer, to generate a third intermediate alternating current using first direct current to alternating current converter, to generating an alternating rotor drive current using the transformer in response to the third intermediate alternating current, and to couple the alternating rotor drive current to the first rotor winding; and
    a controller for controlling the inverter and the direct current to direct current converter such that a rotational force is generated in the electric motor in response to a first magnetic field generated in response to the alternating stator drive current in the first stator winding and the alternating rotor drive current in the first rotor winding.

2. The electric vehicle propulsion system of claim 1, wherein the first alternating current is received from an external battery charger via the input.

3. The electric vehicle propulsion system of claim 1, wherein the alternating rotor drive current is converted to a rotor drive direct current by a rotor current transformer and a rotor rectifier and wherein the first rotor winding is excited by the rotor drive direct current.

4. The electric vehicle propulsion system of claim 1, wherein the alternating rotor drive current is coupled to the first rotor winding via a brush and slip ring.

5. The electric vehicle propulsion system of claim 1, wherein the direct current to direct current converter and the inverter are controlled in response to a plurality of control signals generated by a motor controller.

6. The electric vehicle propulsion system of claim 1, wherein the first alternating current is a three phase alternating current and wherein each phase of the three phase alternating current is coupled to the inverter via a separate stator winding.

7. The electric vehicle propulsion system of claim 1, wherein the electric motor is a separately excited motor.

8. The electric vehicle propulsion system of claim 1, wherein a torque is generated in response to the rotational force and wherein the torque is used drive an electric vehicle drive train to propel an electric vehicle.

9. The electric vehicle propulsion system of claim 1, wherein the direct current to alternating current converter is an H bridge inverter.

10. A method of controlling a direct current to direct current converter in an electric vehicle propulsion system comprising:

converting, by a direct current to alternating current converter, a first direct current to a first alternating current and for coupling the first alternating current to a transformer;

generating, by the transformer, a second alternating current in response to the first alternating current and for coupling the second alternating current to a switch;

converting, by an alternating current to direct current converter, the second alternating current, received from the switch, to a charging direct current, and for coupling the charging direct current to a battery;

generating, by a rotor winding, a magnetic field within an electric motor in response to the second alternating current received from the switch, such that a rotational force is generated within the electric motor; and coupling, by the switch, the second alternating current to the alternating current to direct current converter and for isolating the transformer from the rotor winding in response to the electric vehicle propulsion system being in a charging mode; and coupling, by the switch, the second alternating current to the rotor winding and isolating the transformer from the alternating current to direct current converter in response to the electric vehicle propulsion system being in a propulsion mode.

11. The method of controlling the electric vehicle propulsion system of claim 10, wherein the direct current to alternating current converter is controlled by an inverter controller in response to the electric vehicle propulsion system being in the propulsion mode and a charge controller in response to the electric vehicle propulsion system being in the charging mode.

12. The method of controlling the electric vehicle propulsion system of claim 10, wherein the direct current to alternating current converter is an H bridge inverter.

13. The method of controlling the electric vehicle propulsion system of claim 10, wherein the electric motor is a separately excited motor having an unequal number of turns in the rotor winding and a stator winding.

14. The method of controlling the electric vehicle propulsion system of claim 10, further including a second direct current to alternating current converter and a second transformer for converting the first direct current to a second alternating rotor current coupled to a second rotor winding.

15. The method of controlling the electric vehicle propulsion system of claim 10, wherein the first alternating current is a first switched direct current generated by an H bridge portion of the direct current to alternating current converter and wherein the first switched direct current is coupled to a brush slip ring commutator for excitation of the rotor winding.

16. The method of controlling the electric vehicle propulsion system of claim 10, wherein the first direct current is received from at least one of a vehicle battery during the propulsion mode and in response to a rectification of an external alternating current in the charging mode.

17. The method of controlling the electric vehicle propulsion system of claim 10, wherein the rotational force is used to drive an electric vehicle drive train to propel an electric vehicle.

18. The method of controlling the electric vehicle propulsion system of claim 10, wherein the direct current to direct current converter includes an H bridge inverter and wherein the first alternating current is a alternating square wave current and wherein the alternating square wave current is coupled to a brush slip ring commutator for excitation of the rotor winding.

19. A direct current to direct current converter for use in an electric vehicle propulsion system comprising:

a direct current to alternating current converter for receiving a first direct current, for converting the first direct current to a first alternating current and for coupling the first alternating current to a transformer;

the transformer for receiving the first alternating current, for generating a second alternating current in response to the first alternating current and for coupling the second alternating current to a switch;

an alternating current to direct current converter for receiving the second alternating current from the switch, converting the second alternating current to a charging direct current, and for coupling the charging direct current to a battery;

a rotor winding for receiving the second alternating current, and for generating a magnetic field within an electric motor in response to the second alternating current such that a rotational force is generated within the electric motor; and the switch for coupling the second alternating current to the alternating current to direct current converter and for isolating the transformer from the rotor winding in response to the electric vehicle propulsion system being in a charging mode and for coupling the second alternating current to the rotor winding and isolating the transformer from the alternating current to direct current converter in response to the electric vehicle propulsion system being in a propulsion mode.

20. The direct current to direct current converter for use in the electric vehicle propulsion system of claim 19, wherein the first direct current is received from the battery in response to the electric vehicle propulsion system being in the propulsion mode, and is generated by a propulsion inverter in response to a charging alternating current coupled through a stator winding from an external source.

* * * * *